United States Patent
Kowalik et al.

(10) Patent No.: US 9,011,953 B2
(45) Date of Patent: Apr. 21, 2015

(54) METHOD AND UHT INSTALLATION FOR TREATING HEAT-SENSITIVE LIQUID FOOD PRODUCTS

(75) Inventors: Manfred Kowalik, Gescher (DE); Ludger Tacke, Velen (DE); Ludger Leiwering, Laer (DE); Uwe Schwenzow, Ahaus (DE); Dietrich Zimmermann, Baunach (DE)

(73) Assignee: GEA TDS GmbH, Sarstedt (DE)

( * ) Notice: Subject to any disclaimer, the term of this patent is extended or adjusted under 35 U.S.C. 154(b) by 0 days.

(21) Appl. No.: 13/578,998

(22) PCT Filed: Jan. 21, 2011

(86) PCT No.: PCT/EP2011/000247
§ 371 (c)(1),
(2), (4) Date: Sep. 4, 2012

(87) PCT Pub. No.: WO2011/101077
PCT Pub. Date: Aug. 25, 2011

(65) Prior Publication Data
US 2012/0321771 A1    Dec. 20, 2012

(30) Foreign Application Priority Data
Feb. 18, 2010    (DE) .......................... 10 2010 008 448

(51) Int. Cl.
| A23L 1/00 | (2006.01) |
| A23C 3/037 | (2006.01) |
| A23L 3/16 | (2006.01) |
| A23L 3/18 | (2006.01) |
| A23L 3/22 | (2006.01) |

(52) U.S. Cl.
CPC . *A23C 3/037* (2013.01); *A23L 3/16* (2013.01); *A23L 3/18* (2013.01); *A23L 3/22* (2013.01)

(58) Field of Classification Search
USPC ............ 426/511, 520, 521, 522; 99/453, 454; 422/26, 39, 1
See application file for complete search history.

(56) References Cited

U.S. PATENT DOCUMENTS
| 6,673,311 B1 * | 1/2004 | Sotoyama et al. ................. 422/1 |
| 2006/0237859 A1 | 10/2006 | Lopez |
| 2006/0286233 A1 * | 12/2006 | Celin et al. ..................... 426/520 |

FOREIGN PATENT DOCUMENTS
| EP | 0 794 706 A1 | 9/1996 |
| WO | WO 02/060281 A1 | 8/2002 |

OTHER PUBLICATIONS

Anonymous; "The microbiologically safe continous-flow thermal sterialization of liquid foods", Trends in Food Science & Technology, vol. 4, Apr. 1993, pp. 115-121.
Burton, H. Ed et al.; "Ultra-High Temperature Processing of Milk and Milk Products, Passage", Jan. 1, 1998 pp. 101-111.

* cited by examiner

*Primary Examiner* — Drew Becker
*Assistant Examiner* — Preston Smith
(74) *Attorney, Agent, or Firm* — Merek, Blackmon & Voorhees, LLC

(57) ABSTRACT

The invention concerns a process for the treatment of heat-sensitive fluid food products (P) in a UHT system (1), particularly dairy such as milk, cream, milk protein concentrate. The invention has the task, in a UHT system whose basic structure using an infusion chamber is described in [4], of ensuring an equal and constant dwell time as well as an equal and constant temperature trend for the entire treated food product downstream of an outlet of a mechanism in which the food product is subjected to direct heating by the introduction of steam, and to minimize fouling during heat maintenance of the food product in this area. This is achieved using process technology in that:

The heated food product (P*) upstream of its heat main undergoes a predetermined pressure increase ($\Delta p$) at a predetermined, unchanging location, and The pressure level upstream of the location before the relief lies above the pressure upstream of the location before the pressure increase ($\Delta p$) (FIG. 1).

5 Claims, 2 Drawing Sheets

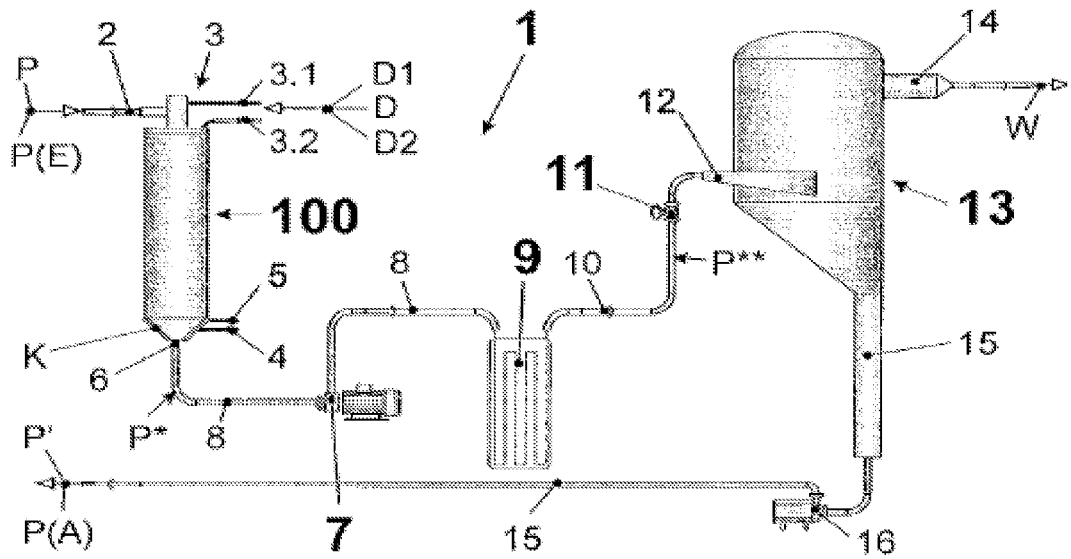
Figure 1
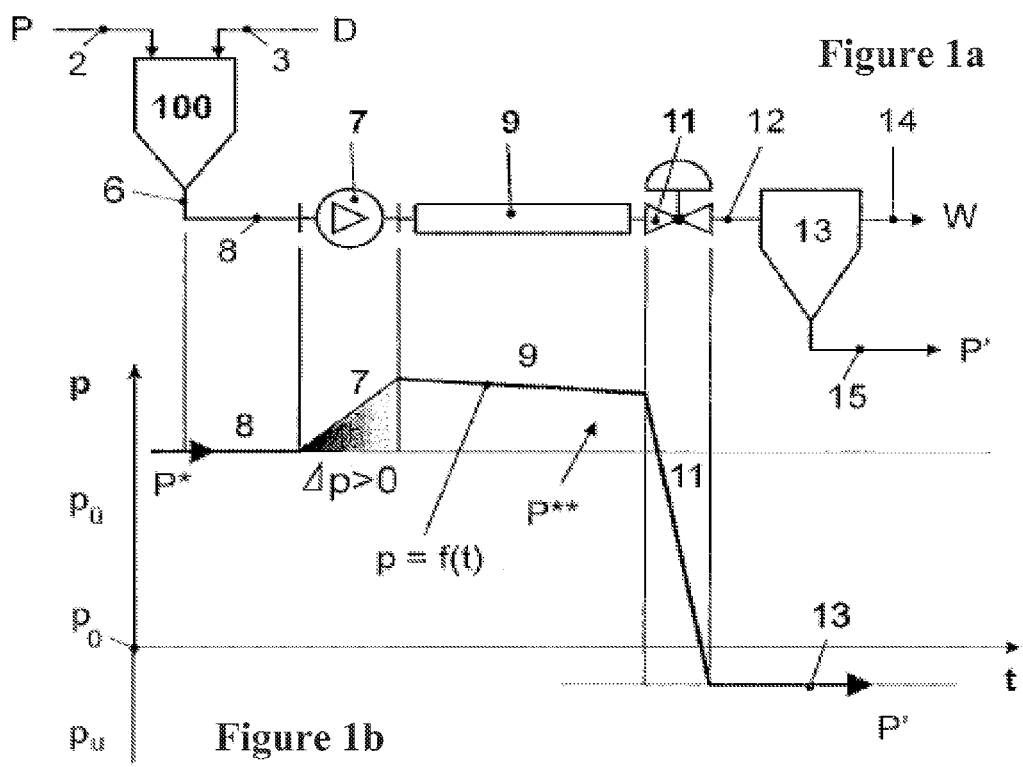
Figure 1a
Figure 1b

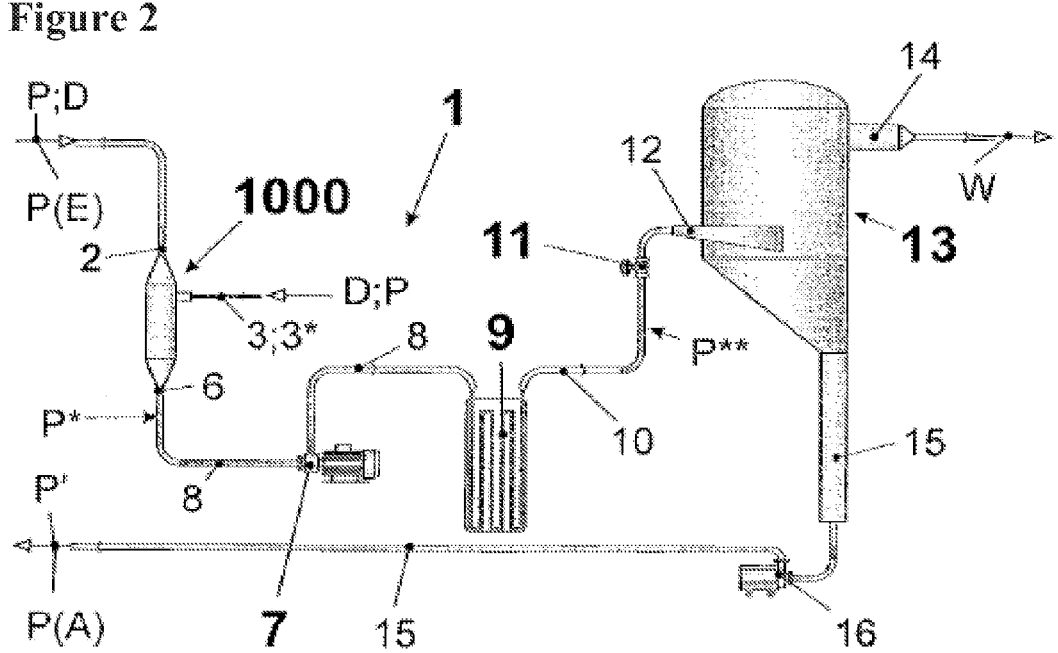
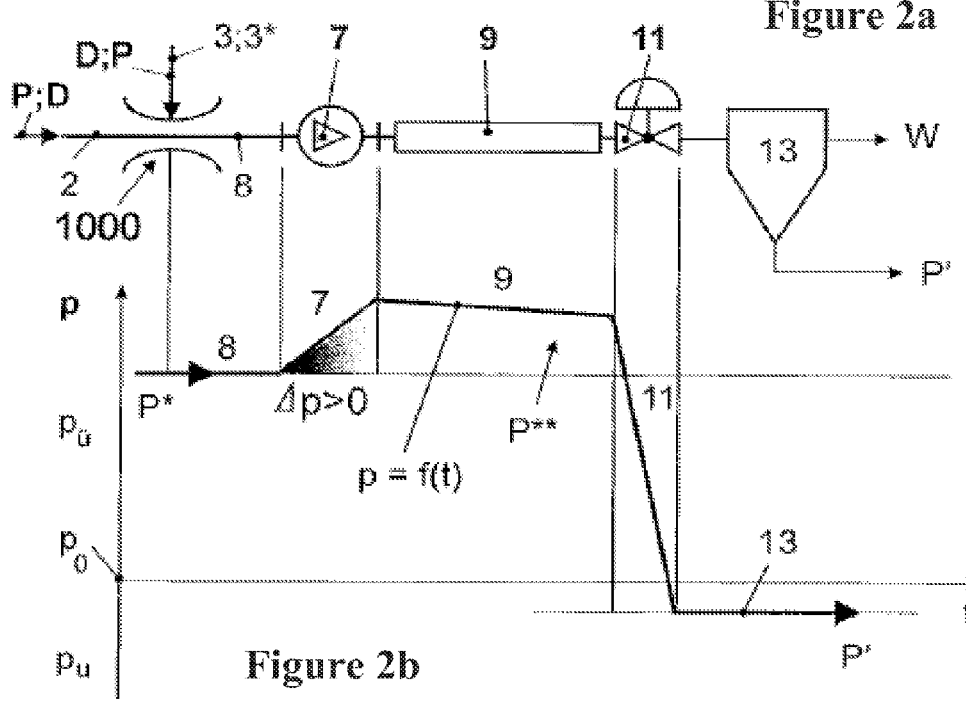

METHOD AND UHT INSTALLATION FOR TREATING HEAT-SENSITIVE LIQUID FOOD PRODUCTS

CROSS-REFERENCE TO RELATED APPLICATION

The present application claims the priority under 35 U.S.C. 119 of German Patent Application No. 10 2010 008 448, filed on Feb. 18, 2012, which is hereby incorporated herein by reference in its entirety.

TECHNICAL AREA

The invention concerns a UHT system for the treatment of heat-sensitive fluid food products, particularly a dairy product such as milk, cream, milk protein concentrate, or buttermilk, using a system in which the food product is subjected to direct heating by means of the introduction of steam, with a vacuum chamber in which water is extracted from the food product, with a line for the food product connecting an outlet of the system to an inlet of the vacuum chamber, with a first conveying mechanism located downstream of the system in the line and with a relief valve located downstream of the first conveying mechanism in the line. The invention also concerns a process for the treatment of heat-sensitive fluid food products in a UHT system of the type just described.

STATE OF THE ART

The treatment of heat-sensitive fluid food products addressed by this invention is used to extend the storage lifetime of these food products and is a well-known and frequently used process. Heat treatment using the heating medium of steam (generally water steam, preferably saturated steam, but also in the superheated state) can be carried out using a variety of processes, either direct or indirect ([1], Heinz-Gerhard KESSLER, Food Process Technology, Focus on Dairy Technology, Edition 1, Munich—Weihenstephan, A. Kessler Publishers, 1976, pp. 154 to 159).

Among the indirect processes, for example, is heating by the use of different heat exchanger variants (pipe bundle heat exchanger, plate heat exchanger). The direct processes include two main groups, namely the injection process using steam ([1], p. 154, 154) and the infusion process using steam ([1], p. 156).

By means of the direct heat exchange between the steam and the fluid food product, the latter is directly, quickly, and efficiently heated. As a result of this fast process, the treatment time can be reduced, which overall leads to reduced heat effect on the food product and this kind of product can be obtained which, especially in terms of taste, retains a high level of quality. Ultra-high temperature heating by the direct mixing of high-quality steam of potable quality with the dairy product to be sterilized takes place at a heating temperature of about 150° C. and over a period of effect of about 2.4 seconds (see [1], p. 145, FIG. 6.15, and page 154). The denaturization of the serum proteins already starts at about 75 to 80° C., whereby the main source of freed SH groups is β-lactoglobulin, which is fully denatured at 130° C. and experiences a maximum in the formation of the cooked taste. A comparison between indirect and direct milk heating shows that with respect to the denatured portion of the β-lactoglobulin, it is significantly higher at 83% after indirect milk heating than at 66% (see [1], pp. 132, 133) after direct heating. Moreover, the vitamin losses are low after gentle heat treatment, that is, with relatively short heating and duration such as those provided by high-temperature and short-term heating. Slightly higher losses occur in ultra-high temperature heating (see [1], p. 133).

In the injection process, the food product to be heated is conveyed by an injector. The steam is injected for the purpose of heating at high pressure directly into the food product acting as a driving stream, and the heat exchange between the mixing material streams is completed in a so-called mixing chamber (DE 10 2007 017 704 A1).

In the infusion process, which infusion heating is in used, the finely divided food product is heated in a steam chamber. The steam and product system pressures are nearly identical in this process. Thus the temperature difference between the heating medium and the food product is significantly lower as in the injection procedure, resulting in an even gentler product handling. The disadvantage of the infusion process in comparison with the injection process is its complicated process technology and higher investment costs. An overview of the process concepts for the sterilization of food products, particularly considering direct heating processes of the type just described, can be found in [2] Saskia SCHWERMANN, Uwe SCHWENZOW in "Process concepts for the manufacturer of ESL milk," three-part article in Deutsche Milchwirtschaft, 11/2008 to 13/2008 (59th year).

The fast, gentle heat treatment using direct heating processes is purchased at the price of higher energy consumption in comparison with the indirect heating process. At the same time, the direct heating process is then preferable when the quality aspects of the food product are in the foreground. There are therefore numerous direct heating processes known that work on the infusion or injection principle.

In all the heating processes outlined so far, regardless of whether it is an indirect or a direct heating process, there are more or less severe deposits particularly in the heater part and in the downstream heat maintenance section not heated from outside or the downstream heat maintainer not heated from outside, leading to quality problems in the food product and/ or to serious cleaning problems, whereby the latter require extensive cleaning times and thus shorter working times for the UHT system and special cleaning procedures and agents. In any case it must be the goal for any heating process to ensure that the food product to be treated, particularly in the heater part and the heat maintainer, to be subject as far as possible to the same dwell time, since different dwell times and thus time of effect, in particular at high processing temperatures, can have negative effects in the way described above.

In connection with the deposits in question and/or the coating that builds up, the literature speaks of "fouling" when heating milk. BURTON is the origin of the classification of the coating into two types A and B (see [3] Dissertation of Johannes PETERMEIER, "Numero-fuzzy model for description of fouling when heating milk," Faculty for Fluid Mechanics and Process Automation at the Technical University of Munich, Apr. 17, 2003, pages 1 through 11). Type A consists primarily of proteins, whereby the dominating protein is the β-lactoglobulin mentioned already, and a salt portion consisting primarily of calcium and phosphate. Type B consists primarily of salts. The dominating opinion is that the accretion is related with the denaturing of the β-lactoglobulin. The accretions on hot walls during the UHT heating can be significantly reduced by preheating the milk with a certain holding period. Gas content in the food product to be treated or gas formation during treatment, in particular in the heat maintenance section or the heat maintainer, favor the formation of coatings and influence the quality of the product.

Publication DK 169 248 B1 discloses a system for the sterilization of milk. Such a system is known as a direct UHT system (direct ultra-high temperature processing system). In these systems, the milk is introduced into a so-called infusion chamber and there introduced into a steam atmosphere (water steam) in such a way that the milk is heated to a temperature of about 140° C. Then the milk is placed into a so-called holding chamber, in which the milk is held in a heated state for a predetermined period (about 2 to 25 seconds). Then the milk enters a vacuum chamber in which the water originating in the steam is removed again in such a way that the solid content of the milk is the same when it exits this vacuum chamber is the same as before the steam was introduced.

The dwell time and temperature curve of the heated milk, starting from its entry into the infusion chamber until its exit into the vacuum chamber, are not sufficiently predetermined in conventional UHT systems and they cannot be controlled uniformly for all the milk portions introduced, since the conveying and control mechanisms that would be needed for this purpose are absent and no specifications can be made or expected in this sense. Moreover, if the product is in the vicinity of the boiling point, its gas content and uncondensed steam can lead to deposits, frequently associated phase separations, and thereby to increased burning, accelerated formation of coatings, and negative quality changes in the product.

EP 0 794 706 B1 mentions and briefly describes a state of the art that is not documented by publications and that attempt to solve the disadvantages described above associated with DK 169 248 B1, in that the holding chamber mentioned above includes a centrifugal pump that is connected by a pipe to the outlet of the infusion chamber, whereby this centrifugal pump pumps the heated milk into a section of pipe that moves through an expansion valve.

This centrifugal pump ensures the fast transition of the heated milk into a pipe section between the centrifugal pump an the expansion valve, where the actual sterilization process is carried out in a few seconds in the heated state, before the temperature falls sharply after transiting the expansion valve. A centrifugal pump tends to favor an uneven distribution of dwell time rather than leading to a more constant dwell time. Boiling out of the product cannot be prevent if it is at or near the boiling point. Since the centrifugal pump cannot effectively decouple the pressure in the system between the centrifugal pump and the expansion valve from the pressure before the centrifugal pump and thus in the infusion chamber, the fill level and thus the dwell time and the temperature in the parts of the system upstream of the centrifugal pump cannot be exactly controlled or defined.

EP 0 794 706 B1 cited above describes a system for the treatment of heat-sensitive fluid foods, such as milk protein concentrates and buttermilk, whereby the system contains an infusion chamber in which the fluid is subjected to heat treatment by introduction of steam, and a therewith connected vacuum chamber to extract water from the fluid. To correct the aforementioned disadvantages of this type of system according to the state of the art, EP 0 794 706 B1 specifies under the invention that the outlet opening of the infusion chamber is directly connected to the inlet of a displacement pump, and that the outlet of the displacement pump is connected with the inlet of the vacuum chamber in such a way that during operation of the system "using the pump" a pressure drop takes place when seen in the flow direction of the fluid.

This solution does differ essentially from the UHT system described in DK 169 248 B1 or the UHT system with a centrifugal pump described in EP 0 794 706 B1 as state of the art, since the heat maintenance of the product and the pressure drop from the pressure in the infusion chamber to approximately the pressure in the vacuum chamber must take place on the short transport path through the conveyor chamber of the flywheel of the displacement pump (see FIG. 2 in EP 0 784 706 B1). The duration of heat maintenance is therefore determined by the pump layout, whereby simple variable adaptation to different operating conditions, process requirements, and food products is more difficult. In the connecting line between the outlet of the displacement pump and the inlet into the vacuum chamber, the pressure reduction can lead to gas formation and thus to phase separations (fluid/fluid and/or fluid/solid) with the associated negative quality changes in the product. Since no mechanical changes to the flow can take place in the connecting line downstream of the displacement pump, uncontrolled dwell time effects can be anticipated there that also have negative effects on the quality and formation of fouling.

In the publication [4] BURTON, H., Ultra-High-Temperature Processing of Milk and Milk Products, London and New York, Elsevier Applied Science Publishers Ltd., 1988, pages 111-114, IBAN 1-85166-170-0, a UHT system is described with in infusion mechanism driven by steam, an expansion container under the required vacuum, a connecting line between the infusion mechanism and the expansion container, a displacement pump located in the connecting line downstream of the infusion mechanism, and a relief valve located in the connecting line downstream of the displacement pump. According to the description on page 112, last paragraph, the heated product is driven by the steam pressure in the infusion mechanism through the connecting line that serves as a holding section for heat maintenance and the following relief valve. Thus between the infusion mechanism and the relief valve there is a forced pressure drop due to flow and friction loss and the displacement pump is limited to controlling the dwell time and the flow of the product precisely. A UHT system as described in [4] is the basis for the process of this invention.

The publication of [5] STROUP, W. H., PARKER, R. W., DICHERSON Jr., R. W., Steam Infusion Heater for Ultra High-Temperature Pasteurization, in Journal of Dairy Science, Vol. 55 (1972), issue 4, pages 536-539, describes a UHT system with an infusion chamber, a control pump located on its outlet that ensures temperature control and a constant dwell time during the process in a following heat maintenance section, and a vacuum chamber into which the heat maintenance section opens. On page 539, right column, paragraph 2, with respect to the pressure level in the infusion chamber and the following heat maintenance section it is required that the pressure within the infusion chamber must be at least 0.6 atm above a pressure "psvp", whereby this is an abbreviation for "product saturation vapor pressure". Thus even this known UHT system provides for a forced pressure drop caused by a flow and friction loss between the infusion chamber and the downstream end of the heat maintenance section, and the control pump is restricted to the accurate regulation of the dwell time and the flow of the product.

It is the task of this invention, in a UHT system whose basic structure using an infusion chamber is described in [4], to ensure equal and constant dwell times and equal and constant temperature trends for the entire treated food product downstream of an outlet of a mechanism in which the food product is subjected to direct heating by the introduction of steam and to minimize the fouling during heat maintenance of the food product in this region. Moreover it is also the goal of the invention to specify a UHT system for the performance of the invented process.

SUMMARY OF THE INVENTION

The invented process for the treatment of heat-sensitive fluid food products in a UHT system is based on a conventional process in which steam directly heats the fluid food product to form a germ-free state, a heated food product is kept hot for a defined and controlled dwell time, and in which water in an amount corresponding to that of the previously introduced steam is then extracted from a heated food product by relief to a lower pressure.

The invented process technology solution consists of subjecting the heated food product, at a predetermined, unchanging location upstream of its heat maintenance, to a predetermined pressure increase, and in that the pressure level upstream of the point before the relief lies above the pressure level upstream of the location before the pressure increase.

This predetermined, unchanging location uniquely determines the dwell time conditions upstream of that location, with equal effect for the entire treated food product. For the treated food product flowing downstream of this location, this also means uniquely determined dwell time conditions with equal effect over the entire treated food product, as well as increased, equal pressure conditions due to the planned pressure increase. In the area of the heat maintenance, food product treated in this way is subject to a forced pressure drop due to the flow and friction loss, as is also described as inevitable in the known UHT systems describes above as the state of the art, however, the pressure level directly before the planned relief, as seen in the flow direction, is still significantly higher than that assumed by the pressure increase according to the invention.

The pressure increase according to the invention works against a boiling out of the food product and the associated release of gas, on the one hand. And on the other, the gas release of non-dissolved gas components and release of non-condensed steam is reliably prevented, particularly because without this pressure increase the food product would like at or near the boiling point.

It is known that gas release in so-called heat maintenance that is not heated from outside and that extends up to the previously mentioned relief, and here on the walls of the heat maintenance, leads to increased burning of the food product and deposits with significantly faster deposit speed, the protein fouling described above, which necessitate cleaning of this area at much shorter intervals than would be the case if such gas release were avoided.

The planned pressure increase is achieved with the conventional displacement pump in the UHT system, whose function was limited until now to accurate regulation of the dwell time and the flow of the product. The volume flow/pressure characteristic of such a displacement pump decouples the system pressure downstream of the pump from that upstream, so that the working conditions of a system in which the food product is subjected to direct heating by introduction of steam, namely the pressure and the volume flow, are uniquely defined. Furthermore, the displacement pump, regardless of whether it is implemented as a rotating or oscillating pump has a greater or lesser self-cleaning property, whereby either the coating on the wall surfaces moistened by the food product is prevented even during its formation, or coatings that do form are continually carried away.

The process according to the invention, as suggested, finds advantageous application in dairy products like milk, cream, or milk protein concentrate.

During implementation of the process according to the invention using an infusion chamber, it is provided that the fluid food product to be heated is introduced into this chamber in the upper region and that the heated food product is removed from this chamber in the lower region. The food product is introduced into the infusion chamber in a finely divided form and permeates it as a falling flow, whereby steam is introduced into the upper region of the infusion chamber, and whereby during the entire dwell time of the food product into the infusion chamber this experiences a heat exchange with the steam.

The process technology solution with an injector is based on two different operating modes. In the first operating mode, the injector introduces the heating medium of water steam into the food product, whereby the flow of the steam results from the pressure drop due to the speed of the food product. In this case, the food product represents the necessary driving stream. The second operating mode provides that the food product is introduced into the heating medium of steam, whereby the flow of the food product results from the pressure drop due to the speed of the steam. In this case, the steam represents the necessary driving stream.

The placement of a displacement pump within the UHT system in question is possible without restriction in combination with the infusion chamber described above, or alternatively with the injector described above. If the mechanism is implemented as an injector, as provided by an advantageous embodiment of the UHT system, then the pressure is regulated downstream of the displacement pump to a predetermined pressure, whereby then the working conditions of the injector, namely the pressure of the food product and that of the steam and, depending on these, the heating temperature of the steam and the volume flow, are uniquely determined. Underfeeding of the injector is ruled out under these conditions.

If the mechanism is implemented as an infusion chamber, as provided by a different advantageous embodiment of the UHT system, then the characteristics of the displacement pump ensure a constant volume flow in the pump and thus equally at the outlet of the infusion chamber, so that the fluid level in the infusion chamber can be regulated at a constant and smallest possible height. This results in the lowest possible and uniquely defined dwell time of the food product between the fluid level and/or the outlet of the infusion chamber and the inlet into the displacement pump and on the way through the pump, without the risk of differing dwell times in that area. Underfeeding of the infusion chamber is ruled out under these conditions.

Since UHT systems with either injector or infusion chamber each specify a defined volume following, the dwell time of the food product at the relevant heat maintenance level between the displacement pump and a relief valve that effects the necessary relief of the heated food product is equally defined and predetermined by the cross-section of the transition and the implemented and easily changed flow path in this area. Moreover, the temperature drop only takes place in the relief valve, whereby according to an advantageous embodiment of the UHT system this valve can advantageously be placed directly before the inlet to a vacuum chamber and thus degassing effects can no longer disadvantageously occur in the line, but rather in the vacuum chamber provided for this purpose.

The risk of gas release of the type described above is significantly greater in the injector solution than in the infusor solution, since some necessary, but possibly insufficient, degassing can already take place in the infusion chamber, in contrast with the injector.

A UHT system for the performance of the process according to the invention consists of a mechanism in which the food product is subjected to direct heating by the introduction of steam, a vacuum chamber with the required vacuum in which water is extracted from the food product, an outlet of the mechanism connected to the inlet of the vacuum chamber through a connecting line for the food product, a first conveying mechanism located downstream of the mechanism in the connecting line, which mechanism is implemented as a displacement pump, and a relief valve located in the connecting line downstream of the first conveying mechanism.

The displacement pump is preferably a rotating displacement pump, which can be implemented for example as a toothed, vane, screw wheel, impeller, or rotating piston pump. Displacement pumps that work by oscillation can in principle also be used if the volume flow fluctuations caused by the oscillating operation are compensated by suitable means or play no role in the treatment process.

To dimension the necessary heat maintenance of the food product in a planned and unique manner, it is also provided that the connecting line is implemented as a heat maintenance section in the area between the first conveyor mechanism, the displacement pump, and the relief valve. Alternatively, another proposal provides that a heat maintainer is located in the connecting line in the area between the displacement pump and the relief valve.

The relief valve is advantageously placed directly before the inlet into the vacuum chamber, so that degassing effects can no longer take place disadvantageously in the line but rather in the vacuum chamber provided for that purpose.

To transfer the directly heated food product into the region of increased pressure as quickly as possible, an advantageous embodiment of the outlet of the injector or the infusion chamber opens directly into the displacement pump.

Regarding the infusion chamber, it is proposed that an inlet for the food product should open into its upper region, that the outlet should open from its lower region in a narrowing floor, and that the infusion chamber should have a steam inlet for the heating medium of steam in the upper region.

If an injector is provided for the direct heating of the food product, then there are two embodiments possible. The first is with an inlet to introduce the food product, with a steam inlet to introduce the steam and with an outlet to remove the heated food product, whereby the steam flows into the food product acting as the driving stream. The heating medium of steam is introduced into the food product, whereby the flow of the steam originates in the pressure drop resulting from the speed of the food product. The other embodiment reverses these conditions appropriately, in that the food product is introduced into the heating medium of steam and the flow of the food product originates in the pressure drop resulting from the speed of the steam. This embodiment is provided with an inlet for introduction of the steam, a product inlet to introduce the food product, and with an outlet to remove the heated food product, whereby the food product flows into the steam acting as driving stream.

BRIEF DESCRIPTION OF THE DRAWINGS

A more detailed presentation can be taken from the following description and the attached figures as well as from the patent claims. While the invention is implemented in a variety of process variants and embodiments of the UHT system for performance of the process, the drawings each show a preferred embodiment of two essentially different embodiments of the proposed UHT system and are described below in terms of their structure and the process variants that they can be used to perform, as well as in terms of the pressure behavior each implements.

FIG. 1 shows a drawing of a first embodiment of the UHT system according to the invention with an infusion chamber located upstream of a displacement pump and a relief valve located downstream of the displacement pump;

FIG. 1a shows a schematic diagram of the UHT system in FIG. 1;

FIG. 1b shows a qualitative pressure/time characteristic corresponding to the representation in FIG. 1a;

FIG. 2 shows a drawing of a second embodiment of the UHT system according to the invention, with an injector located upstream of a displacement pump and a relief valve located downstream of the displacement pump;

FIG. 2a shows schematic diagram of the UHT system in FIG. 2;

FIG. 2b shows a qualitative pressure/time characteristic corresponding to the representation in FIG. 2a.

MORE DETAILED DESCRIPTION

A UHT system 1 in a first embodiment (FIGS. 1, 1a, 1b) in the context of the invention to be described primarily comprises an infusion chamber 100, a first conveying mechanism 7 that is implemented as a displacement pump, preferably a rotating one, and is located in a first line section 8 of a connecting line 8/10 leading from an outlet 6 of the infusion chamber 100 to an inlet 12 of a vacuum chamber 13. The displacement pump 7 conveys a food product P to be treated, particularly a heat-sensitive fluid food product, from infusion chamber 100 to the vacuum chamber 13. The infusion chamber 100 is provided to subject the food product P to direct heating by the introduction of steam D, preferably saturated steam but also as hot steam.

The food product P to be treated enters the infusion chamber 100 in the upper region as an entering product stream P(E) through an inlet 2. Also in the upper region of infusion chamber 100 there is a steam inlet 3 for the introduction of the steam D. In the example embodiment, the steam inlet 3 consists of a first steam inlet 3.1, which guides a part of the steam D as a first steam D1 into the center of the infusion chamber 100 from above and allows it to emerge there as a free core stream. The other part of the steam D introduced is also introduced, also in the form of free jets, as a second steam D2 through a second steam inlet 3.2 into infusion chamber 100 from above, through a series of inlet openings arranged in the form of at least one ring-shaped circle in the radially exterior area in the vicinity of the liner. The incoming product flow P(E) also enters the infusion chamber 100 from above, whereby it surrounds the core stream of the first steam D1 in the shape of a ring and is itself surrounded in the shape of a ring by the emerging second steam D2. The food product P, distributed in the form of fine droplets or a film, permeates the infusion chamber 100 as a falling stream, experiencing a heat exchange with the steam D1 and D2 on the way to the outlet 6, and leaves outlet 6 as the heated food product P*. Outlet 6 opens in the lower region of the infusion chamber 100 from a floor part that narrows as it descends, which is provided with a coolant inlet 4 and a coolant outlet 5 to allow it to be exposed by to a coolant K.

To provide a uniform dwell time between the outlet 6 and a suction-side inlet to displacement pump 7, it is advantageous if the outlet 6 opens directly into the displacement pump 7.

Preferably immediately upstream of the inlet 12 of vacuum chamber 13, in a second line section 10 of the connecting line 8/10 that connected to the first line section 8, there is a relief valve 11 that also acts as a pressure retention valve for a system pressure p to be maintain upstream of the relief valve 11 in the line sections 8, 10 (see FIGS. 1*b*, 1*a*). The line sections 8, 10 between the displacement pump 7 and the relief valve 11 can, with no further measures, provide heat maintenance for the heated food product P*, which then as the heated food product P experiences its pressure reduction in the relief valve 11** from an overpressure $p_o$ to an underpressure $p_u$, each relative to a current atmospheric pressure $p_0$ (see FIG. 1*b*), and enters the vacuum chamber 13, which is under this underpressure $p_u$.

The connecting line 8/10 is, according to a proposed embodiment, implemented as a special heat maintenance section in the area between the displacement pump 7 and the relief valve 11 in a conventional manner, or there can alternatively be a conventional heat maintainer 9 located there.

The vacuum chamber 13 is formed in such a way that it extracts from the heated food product P, cooled by the pressure reduction in the relief valve 11, that quantity of water as so-called flash steam that was introduced in the form of steam D, or D1, D2, into infusion chamber 100, and which then emerges from a flash valve preferably located in the upper region. Such a concentrated treated food product P' leaves the vacuum chamber 13 through a drain line 15 preferably located in the lower region from a narrowing floor, on a path through a second conveying mechanism 16, preferably implemented as a centrifugal pump, and is introduced as an emerging product stream P(A) into a downstream area of the UHT system 1** that is not shown.

The basic concept of the invention, namely that due to the effect of the displacement pump 7 in combination with the connecting line 8/10 and the relief valve 11 during operation of the UHT system 1 through and by means of the displacement pump 7, seen in the flow direction of food product P or P*, P**, a pressure increase $\Delta p$ to overpressure $p_o$, is clarified graphically in FIG. 1*b*, in which the y axis is the system pressure p and the x axis is the time t (time axis) (p=f(t)). This pressure increase $\Delta p$, which is a positive pressure change $\Delta p > 0$, thus a pressure increase with respect from the system pressure p obtaining upstream of the displacement pump 7, acts in the direction of the time axis t shown as the x axis in FIG. 1*b* and thus in the direction of the flow path of the food product P*, P**.

The pressure level p=f(t) achieved by the displacement pump 7 is in any case reduced by the pressure loss over the area of the additional UHT system 1 up to the relief valve 11 caused by the flow and friction resistance there. The system pressure p=f(t) that obtains between the displacement pump 7 and the relief valve 11 in any case remains above the pressure level that obtains directly downstream of the infusion chamber 100 or upstream of the displacement pump 7, and thus significantly above the boiling limit of the heated food product P. In relief valve 11, there is then a pressure reduction to the underpressure $p_u$ obtaining in the vacuum chamber 13** with respect to atmospheric pressure $p_0$.

It has proved particularly advantageous when the pressure increase $\Delta p$ in the displacement pump 7 is arranged in such a way that the heated food product P upstream and directly before its relief in the relief valve 11**, preferably directly at its inlet, has a system pressure p that is at least 1.5 bar above that upstream of the pressure increase $\Delta p$.

Due to the system characteristics of the UHT system 1 in the first embodiment as described above, the process characteristic according to the invention can be implemented that consists of the fact that the heated food product P, before its heat maintenance as seen in the flow direction, undergoes a predetermined pressure increase $\Delta p$ at a predetermined, unchanging location with the goal described above. This location, independently of fluctuations in operating conditions and due to the special displacement pump characteristic that achieves a decoupling of the system pressures p upstream and downstream of the displacement pump 7, is permanently at the suction-side inlet of the displacement pump 7 and thus, due to the preferably narrow and direct connection of the latter to infusion chamber 100, also at outlet 6**.

A second embodiment of the UHT system 1 according to the invention (FIGS. 2, 2*a*, 2*b*) differs from the first shown in FIGS. 1, 1*a*, and 1*b* in that the mechanism in which the food product P to be treated is subjected to direct heating by means of introduction of steam D is now implemented according to the invention as an injector 1000. The other components of the UHT system 1 as shown in FIG. 1 are, insofar as they do not directly belong to infusion chamber 100, embodied identically in the second embodiment and have the same corresponding effects there. We will therefore forego a description.

The injector 1000, in a first embodiment, has on the one hand an inlet 2 for the introduction of the food product P to be treated, which leaves it on the other hand at its outlet 6 as the heated food product P*. A steam inlet 3 is used to introduce the steam D needed for direct heating, whereby steam D flows into the food product P acting as the driving stream. This first embodiment is therefore characterized in that the heating medium of steam D is introduced into the food product P and the flow of steam D is caused by the pressure drop that results from the speed of the food product P.

The second embodiment of the injector 1000 is characterized in that the food product P enters the heating medium of steam D and that the flow of the food product P is caused by the pressure drop that results from the speed of the steam D. Here, the injection 1000 provided with an inlet 2 for the introduction of the steam D, with a product inlet 3*  for the introduction of the food product P, and with an outlet 6 for the removal of the heated food product P*, whereby the food product P flows into the steam D acting as the driving stream.

The pressure/time characteristic p=f(t) shown in FIG. 2*b* is qualitatively equivalent to that shown in FIG. 1*b*; however, the overpressures $p_o$ in the injector 1000 and the infusion chamber 100 slightly differ from one another. In the second embodiment of the UHT system 1, it is again the important point that the effect of the displacement pump 7 in combination with the connecting line 8/10 and the relief valve 11 during operation of the UHT system 1 results, through and by means of displacement pump 7 seen in the flow direction of the food product P, in a pressure increase $\Delta p > 0$ with the goal described above.

LIST OF REFERENCE NUMBERS FOR ABBREVIATIONS USED

| | | | |
|---|---|---|---|
| 1 | UHT system | | |
| 100 | Infusion chamber | | |
| 1000 | Injector | | |
| | Infusion chamber 100 | | Injector 1000 |
| 2 | Inlet (for food product P) | 2 | Inlet (for food product P or steam D) |
| 3 | Steam inlet | 3 | Steam inlet |
| 3.1 | First steam inlet | 3* | Product inlet |
| 3.2 | Second steam inlet | | |
| 4 | Coolant inlet | | |
| 5 | Coolant outlet | | |
| 6 | Outlet | | |
| 7 | First conveying mechanism (e.g. rotating displacement pump, such as toothed, vane, screw wheel, impeller pump; oscillating displacement pump) | | |
| 8/10 | Connecting line | | |
| 8 | First line section | | |
| 10 | Second line section | | |
| 9 | Heat maintainer/heat maintenance section | | |

-continued

LIST OF REFERENCE NUMBERS FOR ABBREVIATIONS USED

| | |
|---|---|
| 11 | Relief valve/pressure maintenance valve |
| 12 | Inlet |
| 13 | Vacuum chamber |
| 14 | Flash outlet |
| 15 | Drain line (treated food product P') |
| 16 | Second conveying mechanism |
| D | Steam (preferably as saturated or hot steam) |
| D1 | First steam (preferably as saturated or hot steam) |
| D2 | Second steam (preferably as saturated or hot steam) |
| K | Coolant |
| P | Food product to be treated |
| P' | Treated food product |
| P* | Heated food product |
| P** | Heated food kept hot |
| P(A) | Emerging product stream |
| P(E) | Entering product stream |
| W | Water |
| p | System pressure, general (pressure axis) |
| $p_0$ | Atmospheric pressure |
| $p_u$ | Underpressure |
| $p_o$ | Overpressure |
| $\Delta p$ | Pressure change in general |
| $\Delta p > 0$ | Pressure increase (positive pressure change) |
| t | Time (time axis) |

The invention claimed is:

1. A process for the treatment of heat-sensitive fluid food products (P) in a system for ultra-high temperature processing (UHT system) (1), in which steam (D) directly heats the fluid food product (P) in a heating chamber to form a germ-free state, a heated food product (P*) is kept hot in a heat maintainer section for a defined and controlled period, and in which water in a quantity corresponding to that of the previously introduced steam (D) is removed in a vacuum chamber from a heated food product (P**) by means of pressure relief, characterized in that the steam heated food product (P*) is pumped from the heating chamber through a pump system into the heat maintainer section and through a pressure relief valve into the vacuum chamber, wherein the steam heated product is subjected to a predetermined pressure increase ($\Delta p$) in the pump system upstream of the predetermined, unchanging heat maintainer section, the pressure level upstream of the vacuum chamber before the pressure relief is higher than the pressure level upstream of the pump system before the pressure increase ($\Delta p$), the pressure increase ($\Delta p$) is specified in such a way that the heated food product (P**) has a system pressure (p) upstream of and directly before its pressure relief that is at least 1.5 bar greater than that upstream of the pump system pressure increase ($\Delta p$), and the system pressure (p) downstream of the pump system pressure increase ($\Delta p$) is decoupled from that upstream.

2. Process according to claim 1, characterized in that the food product (P) is a dairy product.

3. Process according to claim 1, characterized in that an infusion chamber (100) is provided, into which the fluid food product (P) to be heated is introduced in the upper region and from which the heated food product (P*) is removed in the lower region (2c), whereby the food product (P) enters the infusion chamber (100) in a finely divided form and permeates it as a falling stream, whereby the steam (D) is introduced into the upper region of the infusion chamber (100), and whereby during the entire dwell time of the food product (P) in the infusion chamber (100), it engages in a heat exchange with the steam (D).

4. Process according to claim 1, characterized in that an injector (1000) is provided for the introduction of either:
the heating medium of steam (D) into the food product (P), whereby the flow of the steam (P) is caused by the pressure drop resulting from the speed of the food product (P), or
the food product (P) into the heating medium of steam (D), whereby the flow of the food product (P) is caused by the pressure drop resulting from the speed of the steam (D).

5. The process according to claim 1, wherein the vacuum chamber further includes an upper flash outlet for removing water from the vacuum chamber and a lower drain line for removing steam heated product from the vacuum chamber.

* * * * *